United States Patent [19]
Edgar

[11] Patent Number: 5,266,805
[45] Date of Patent: Nov. 30, 1993

[54] SYSTEM AND METHOD FOR IMAGE RECOVERY

[75] Inventor: Albert D. Edgar, Austin, Tex.

[73] Assignee: International Business Machines Corporation, Armonk, N.Y.

[21] Appl. No.: 878,587

[22] Filed: May 5, 1992

[51] Int. Cl.$^5$ .......................................... G01N 21/88
[52] U.S. Cl. .................................. 250/330; 250/341; 354/104; 382/54
[58] Field of Search .................. 354/104, 103; 382/54; 250/327.2 D, 340, 341, 330

[56] References Cited

U.S. PATENT DOCUMENTS

| | | | |
|---|---|---|---|
| 3,715,962 | 2/1973 | Yost, Jr. | 354/68 |
| 4,160,601 | 7/1979 | Jacobs | 356/404 |
| 4,683,496 | 7/1987 | Tom | 358/166 |
| 5,151,596 | 9/1992 | Saotome | 250/327.2 |

FOREIGN PATENT DOCUMENTS

| | | | |
|---|---|---|---|
| 60-115820 | 6/1985 | Japan | 250/341 |
| 574693 | 9/1977 | U.S.S.R. | 354/104 |

*Primary Examiner*—Constantine Hannaher
*Attorney, Agent, or Firm*—Robert M. Carwell

[57] ABSTRACT

A system and method to compensate for effects of a recording medium such as film on image data retrieved therefrom. Red, green, blue, and infrared light is sequentially transmitted through film having an image exposed therein to the system which captures corresponding images. The infrared image maps the location, boundaries and intensities of the media defects. The map is employed combinatorially with the other captured images resulting in an image from the film free of the effects of the film defects. In one embodiment the effects of the imperfections are divided out from the red, green, blue spectra in an operation dividing out the infrared image data on a pixel-by-pixel basis. In an alternate embodiment wherein the imperfections substantially prevent transmission of IR light therethrough, the IR image map of the defects is nevertheless employed with an automated fill-in algorithm more effectively utilized due to the precision with which the defect boundaries are known.

41 Claims, 6 Drawing Sheets

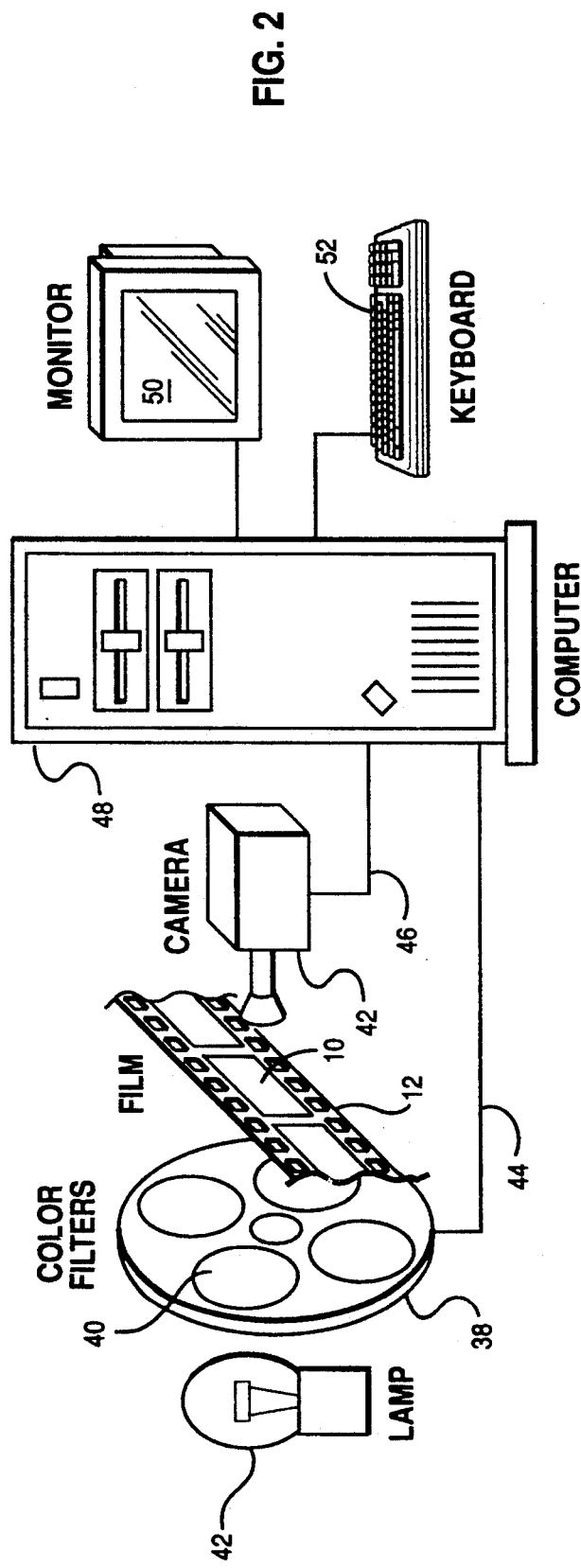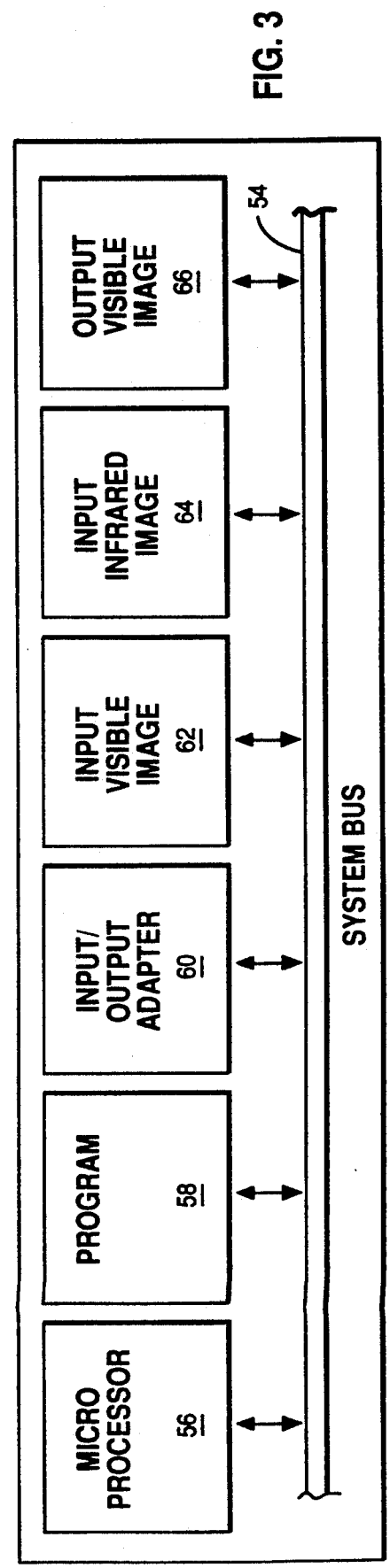

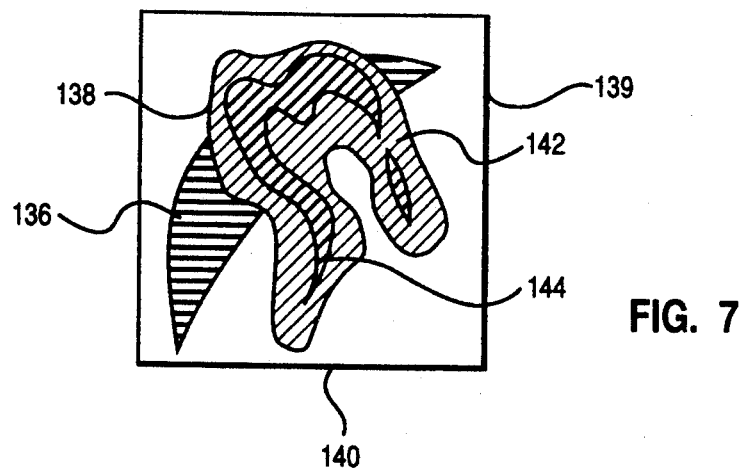
FIG. 7
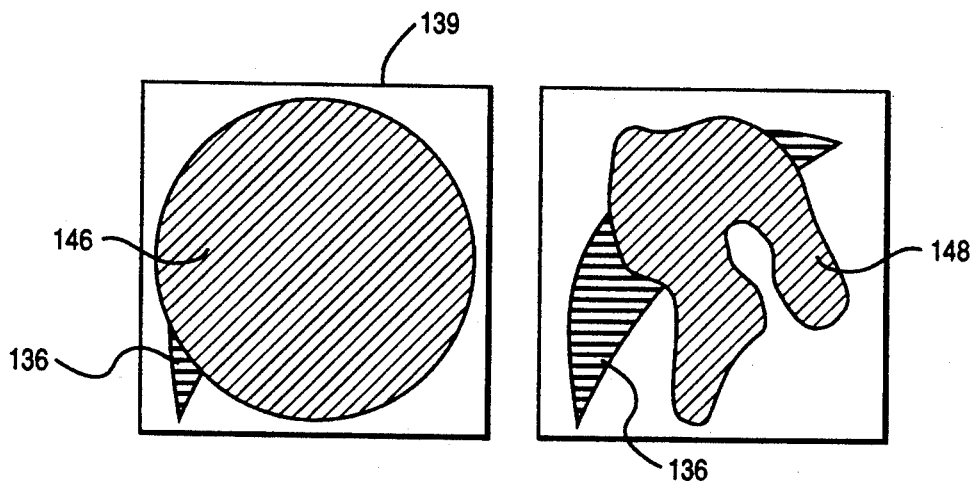
FIG. 8A
PRIOR ART
FIG. 8B
PRIOR ART
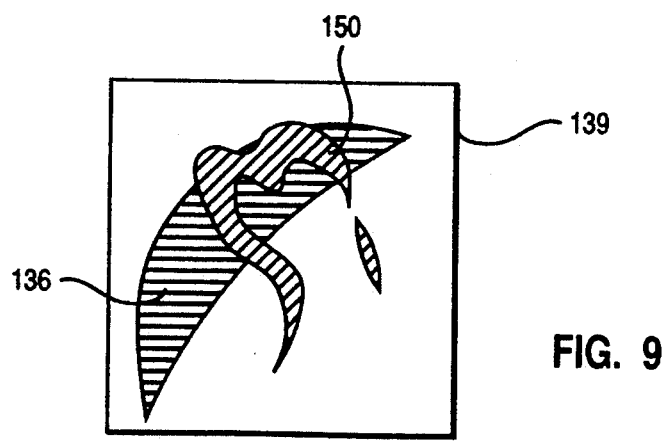
FIG. 9

SYSTEM AND METHOD FOR IMAGE RECOVERY

FIELD OF THE INVENTION

This invention relates to image enhancement and recovery, and, more particularly to systems and methods which compensate for the effects of storage media defects on images stored therein

BACKGROUND OF THE INVENTION

Ever since the first image of an object was captured on film, a serious problem was apparent which has continued to plague the field of image capture and reproduction to the present day, namely imperfections in the recording medium itself which distort and obscure the original image sought to be captured. These imperfections occur in innumerable forms including dust, scratches, fingerprints, smudges and the like. Archival polypropylene sleeves employed to protect negatives even contribute to the problem by leaving hairline surface scratches as the negatives are pulled out of and replaced into the sleeves.

The problem is even worse with such negatives than with transparencies, first because viewing the negative requires a gamma, or ratio gain, of more than two, and secondly because filmstrips are more subject to contact than are mounted transparencies. Such imperfections may be found present even in fresh photographic film in surface waves, and may further arise from improper processing causing mild reticulation, and unbleached silver for example. Not only are such non-image imperfections surface related but can even be caused for example by microbubbles in emulsion within the film itself.

Numerous measures have been developed in the art in an attempt to address the problem, particularly with respect to captured high resolution images. One approach has been that of prevention as for example, in the development process itself. Expensive anti-static equipment including spray machines to neutralize dust-attracting charges are employed for example by reputable photo finishers. Photo finishers also attempted to employ diffuse light source enlargers that helped reduce the effects of refraction of the light by imperfections in the photo finishing processes.

Yet another way the problem was approached sought to minimize the effects of these imperfections once they were present by various correction techniques, most of which were manual and thus highly labor-intensive and expensive. As an example, during the photo finishing process, a highly trained individual might spend a great deal of time with various spotting dyes and an extremely small spotting brush seeking to essentially paint out the imperfections. Another technique was to wipe on or immerse the negatives in a light oil in an attempt to optically fill scratches.

The problem of dust, scratches and the like in large measure contributed to the decline in use and popularity of vinyl records. The film industry has been concerned that the problem may in like manner jeopardize the long term future of analog images. Notwithstanding the significant efforts that were made to solve the problem it seemed that no matter what was done the problem nevertheless persists. This is particularly with respect to enlargements and high resolution scans. Thus the problem is becoming even more acute and recognized as resolution increases and multimedia brings attention to it with the increase in film scanning for computer applications.

As the art developed, various attempts were made to automate the correction process, particularly with respect to digital image systems. In such systems once an imperfection was detected, various "fill" algorithms had been developed for correcting the image at the situs of the imperfection. Nevertheless, heuristics or human intervention were required to detect the imperfections with a subjective threshold. Typically the identified area to be corrected in this manner was much larger than necessary under the present invention, in part due to these subjective criteria for detecting defective areas.

Automated methods were in fact developed for even detecting imperfect areas in recording media, notably as described in the German patent #2821868.0, published Nov. 22, 1979, entitled "Method and Device for Detecting Recording and Counting of Mechanical Damage to Moving Bands, for Example Films". In this system, a source of infrared energy impinged upon the film medium. A scanned infrared image thereafter was taken of the film in question by sensors detecting reflection of the infrared energy from the film surface. However several limitations were present in this system.

First, its purpose was not to correct an image present on the film for the effects of such detected film defects. Rather the system was implemented simply to monitor the prevalence of these defects in an automated photographic development process whereby, for example, the process could be automatically shut down if the defect rate exceeded a prescribed level. Moreover, infrared image was not recorded in registry with any other images from the visual portion of the electromagnetic spectrum. This alone would render it extremely difficult to subtract out the effect of such imperfections noted in the IR image from similar defects present and visible in the visual record of the image. On the contrary, the optical IR path was a reflective one from the IR source to sensor different from the other sensors unutilized for image processing.

Such systems have in fact been developed for capturing images of objects along an identical optical path wherein each such image corresponds to a different portion of the electromagnetic spectrum, notably in the satellite photography and reconnaissance arts, for example, for purposes of image enhancement. In such systems, images of one spectrum may thus be superimposed on those from another spectrum of the identical object whereupon various image processing algorithms well known in the art might thereafter be employed. For example, an infrared mapping system might functionally relate the IR spectrum of carbon dioxide in an earth surface image from that of another portion of the spectrum to draw conclusions regarding surface vegetation or the like as, for example, in crop inventorying and such techniques have been well developed. However, these systems while in some sense enhancing the captured image, are not detecting through means of the infrared spectrum defects and imperfections associated with the recording medium itself, and thereafter using such information to enhance the image stored on the medium.

From the foregoing, an object of the invention is to automatically render invisible or substantially reduce the effect of physical imperfections of the storage medium such as as dust scratches, and the like, from the desired image stored on the film to be perceived. It is a further object of the invention to precisely detect boundaries of recording medium imperfections.

These and other objects are achieved by the present invention, a description of which follows hereafter and may be better understood with reference to the following figures.

BRIEF DESCRIPTION OF THE DRAWINGS

FIG. 2 is a schematic representation of a representative system for implementing the invention;

FIG. 3 is a functional block diagram of portions of the system of FIG. 2;

FIG. 7 is a schematic illustration of a piece of film containing a defect obscuring an underlying image;

FIGS. 8A and 8B are additional illustrations of the film of FIG. 7 depicting the results of two respective prior art methods for correcting images having defects caused by recording medium imperfections;

FIG. 9 is another illustration of the film of FIG. 7 depicting results of the invention in correcting the image in FIG. 7 for the defects shown therein.

SUMMARY OF THE INVENTION

A system and method for use in compensating for effects of storage media defects on image data retrieved therefrom. Image data is stored on a recording medium containing non-image imperfections such as film having surface scratches, waves smudges, bubbles, or the like, which give rise to undesirable artifacts in images subsequently retrieved from the medium.

Means are provided for deriving from the medium separate images in the red, green, blue, and infrared portions of the electromagnetic spectrum corresponding to the image stored therein.

In one embodiment, red, green, blue and infrared light is sequentially directed at one surface of the film by means of a light source and color filter wheel. Corresponding sequential red green, blue, and infrared images formed by that portion of the light being transmitted through the film are digitally captured from the opposite side of the film. The images are preferably captured in registry to facilitate subtracting out effects of imperfections at locations in the infrared record from corresponding locations in the red, green, blue images. The imperffections may either substantially reduce or totally occlude the infrared light. However, remaining portions of the medium having the desired image without such imperfections are essentially uniformly transmissive to the infrared spectrum while of variable transmissivity in the visual spectrum as determined by the image developed on the film. Accordingly, the infrared image may serve s an indicator or map of the spatial position of these non-image imperfections on and in the media, thereby allowing recovery of the underlying desired image.

In the case wherein total occlusion does not occur, inasmuch as imperfections are essentially colorless, the amount of reduction in infrared transmitted through the medium at known locations on the film corresponding to the imperfections can be utilized to increase intensity of the red, green, blue images at these same locations so as to cancel the effect of the imperfections. Alternately, in the case of total occlusion, the infrared record provides an accurate map of the location and shape of the imperfection to which conventional fill-in algorithms are applied.

DETAILED DESCRIPTION OF THE PREFERRED EMBODIMENT

Figure 1:
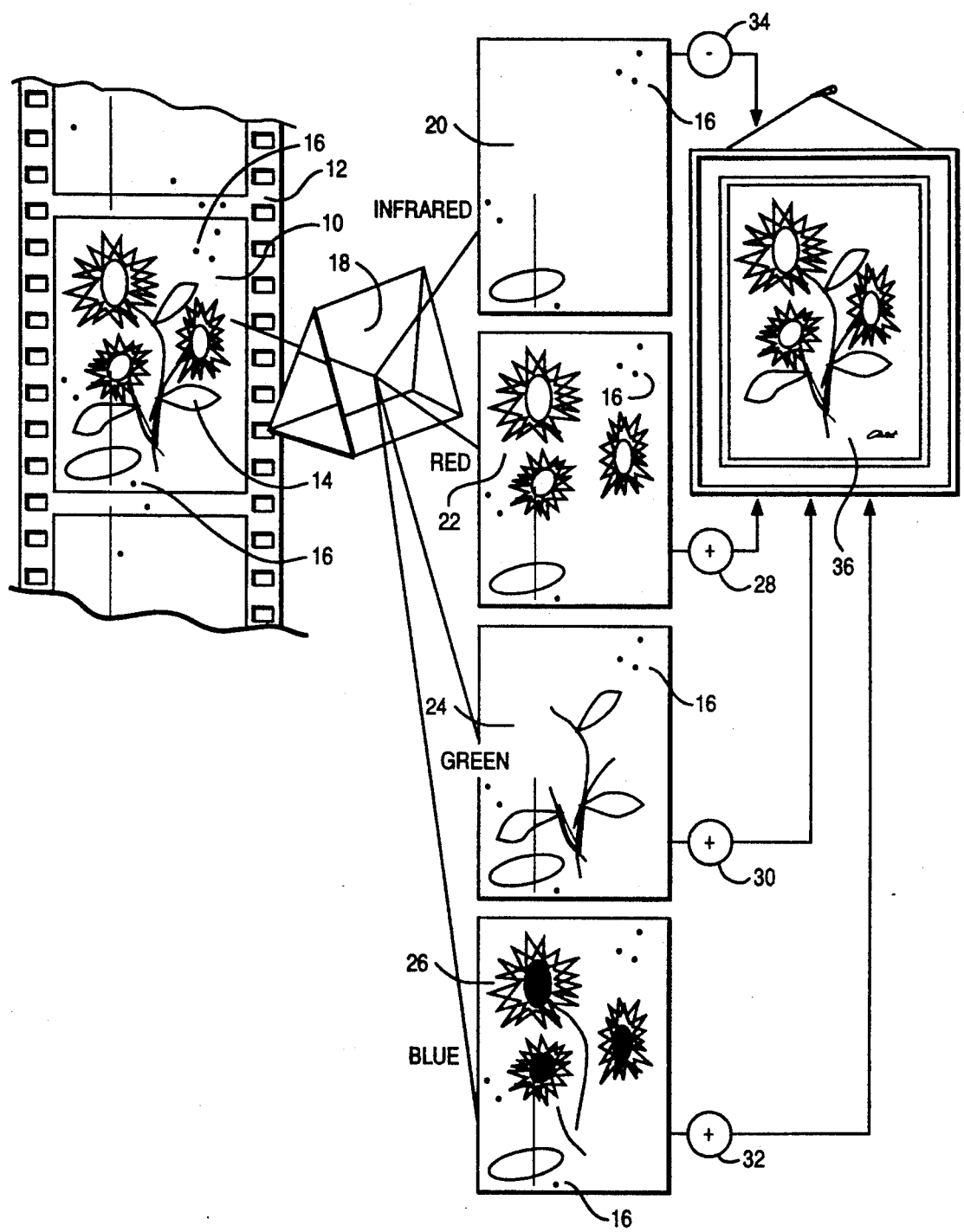
FIG. 1 is an illustration of the separation and recombination of images in different spectra of an object on film having imperfections in order to reduce their effect in the resultant combined image.

Referring to FIG. 1, first a generalized description of phenomenon associated with the invention will be provided in order to facilitate its understanding. In the photographic film art, typical dyes in film or transparencies are transparent to the infrared spectrum, whereas imperfections in the film are not. Thus an infrared image derived from such a film with these physical non-image imperfections will only contain images of these non-dye imperfections. A map of such imperfections from this infrared image may thence be employed to mathematically cancel their effects, and thus derive the desired pure dye image taken from the film.

As hereinbefore set forth numerous imperfections are associated with film, such as dust, smudges, and the like. The terms film and transparency are utilized interchangeably and broadly herein and are intended but not to be limited to include any film media for storing images which passes light including negatives as well as positives. Such imperfections characteristically are almost always colorless and thus affect the infrared spectrum equally with the red, green, and blue components of the visible images retained in the film. This is true of various forms of such imperfections. For example, small surface scratches on film are visible because they refract light out of the visual path. This refraction, although very slightly greater for light of short wavelengths, nevertheless is effectively independent of wavelength. Fingerprints and smudges on film are deposits of transparent oils, and again refraction alone makes them visible. In like manner included bubbles in the emulsion or mild reticulation due to improper film processing again are visible because of refraction, having essentially no color themselves. Dust is yet another foreign agency frequently contributing to degradation in the quality of images retrieved from film media. Most dust is, in like manner, substantially transparent when viewed as a single filament, having a color only when viewed as the sum of many fibers, and again is visible primarily through refraction. In like manner, metallic flecks are opaque, and opaque particles will affect all colors substantially equally, subtracting out an equal percentage of light from the pel on which they lie proportionate to their size, but almost independent of wavelength. It is rare from the foregoing that one may find dust or other particulate matter on film which is substantially colored as an individual filament requiring additional processing to remove the effects thereof from the image beyond those contemplated by the invention.

Because of this almost universal colorlessness of film imperfections, it will appreciated that a "dust" image in the infrared spectrum may be derived from film containing undesired defects and imperfections, and this same image may be applied to red, green, and blue records also obtained from the same portion of film. These imperfections may therefore be seen in the infrared, and this single dust image applied to the three colored red, green and blue records. As a refinement, the dust image may be applied as hereinafter set forth in greater detail with slightly more strength in the blue record and slightly less strength to the red record in order to compensate for the slight color sensitivity of refraction and defraction.

Most imperfections associated with film media reduce light transmitted therethrough to some extent. In accordance with the teachings of the invention, by dividing out the amount of reduction across the red, green and blue images, the effects of the imperfection are thereby nulled on the image desired to be retrieved from the film. As will also be hereinafter detailed, this utilization of the infrared record on the red, green, and blue spectra will not be entirely uniform across each spectrum due to the aforementioned non-linearities associated with refraction and defraction, different sensitivities of film dyes and light sensors to differing spectra, and the like. Such details will be described further but for present purposes in order to understand the invention generally, it may be conceptually understood that the infrared record will essentially be utilized to adjust the affect of the imperfections uniformly in the red, green, and blue spectra.

Although most imperfections associated with film media will reduce light to some extent as aforesaid, in some instances the imperfection may totally occlude a part of the desired image. In such instances in accordance with the invention, when the effects of the imperfection may not be "retracted" by employing the IR map with the red, green, and blue spectra then the invention at least provides an extremely accurate detection of the exact shape and location of the various imperfections in the film, thereby permitting other fill-in algorithms well known in the art to be employed. A significant limitation of those techniques was the inability of such algorithms to accurately distinguish imperfections from image detail. Accordingly, image detail was often lost due to the heuristic, subjective identification of the situs of imperfections which was frequently imprecise due to the human intervention. In accordance with the invention as will hereinafter be described in these cases where imperfections substantially occlude the image, the system and method described herein may be used in conjunction with such fill-in algorithms to automatically render the imperfection effectively invisible because their locations and boundaries are now more precisely identified without unnecessarily losing image detail.

FIG 1 illustrates the foregoing general principles of the invention just discussed. A conventional film transparency 12 has one or more frames 10 which include both an image 14 and physical imperfections or defects 16 previously described associated with the film 12, such as dust, scratches, or the like, which impair the ability to retrieve the pure image 14 from the film 12. In accordance with the invention, a mechanism such as a color wheel or the like (shown conceptually as a prism 18) will be employed to separate the information comprising the image 14 and imperfections 16 into a plurality of individual records, each associated with a different portion of the electromagnetic spectrum. Specifically in sequence infrared 20, red 22, green 24, and blue 26 images of the film 12 are captured.

Referring first to the infrared image or record 20, a comparison of the pattern of imperfections 16 appearing in the film 12 with those appearing in the infrared record 20 will reveal that they are substantially identical in spatial positioning. As previously indicated, these imperfections 16 associated with film 12 will impede transmissivity of the infrared through the film 12, and thus these imperfections appear at locations 16 on the infrared record 20. It will also be noted in the infrared image 20 that the components comprising the image 14 resulting from various photographic dyes exposed in the film 12 do not appear in the image 20. The reason for this is that, again as previously noted, these dyes are essentially transparent to infrared light transmitted through the film 12.

Referring now to the remaining red, green, and blue images 22-26 respectively, each such image will be seen to pick up and record portions of the image 14 of the frame 10 associated with their respective visible spectra. For example, in the green record 24 a number of leaves may be seen which in a color illustration would have generally green hues. However the remaining non-green portions of the image 14 are expectedly absent in the green record 24 This is an example of conventional color separations well known in the art. However again comparing the location of imperfections 16 appearing in the red, green, and blue images 22-26 will reveal that they again are spatially positioned in the image essentially in identical locations to those in which they appear in the original film 12. Moreover these imperfections 16 appear in each of the red green and blue records, again bearing out the previously described property of such imperfections 16, namely that they are essentially colorless and thus impede transmission of red, green and blue light through the film 12 substantially equally.

The operation of the invention generally may now be clearly seen by comparison of these four records 20-26. Because none of the desired visual image 14 appears in the infrared record 20 although the imperfections 16 appear in all four records (and particularly in the records of the visible spectrum otherwise impairing the ability to reconstruct the image 14 without such imperfections 16). a subtractive process may be employed to reconstruct the image 14 from images 20-26 as a new image 36 wherein the imperfections 16 are substantially reduced or eliminated. Specifically, as shown conceptually by the additive processes 28 30, and 32, and subtractive process 34, each red green, and blue image is added together resulting in the improved image 36. However, the infrared image or "map" of the undesirable imperfections 16 are utilized with respect to each of these visual images 22-26 to effectively mathematically subtract out (as shown by process 34) the undesirable affect of these imperfections 16 on each of the records in the visual spectra.

For simplicity's sake at present one may appreciate that if the imperfections 16 show up as imperfections of equal intensity in the red, green, and blue images (due to the uniform transmissivity of the imperfections 16), given that the precise location of these physical imperfections 16 is known from the infrared record 20 (which includes no information from the desired image 14 to be reproduced), these locations of the imperfections 16 in the infrared record 20 may be utilized to uniformly increase the exposure or intensity of pixels at these same precise locations in the red, green and blue records in a reciprocal way to the infrared intensity to result in the improved image 36. Thus, the red green and blue images are recombined (as shown by summing functions 28–32) to result in the image 36, but each such record first has subtracted out (as shown by the subtracting function 34) the intensities at the pixel locations of the imperfections 16 appearing in the infrared record 20 and the corresponding red green, or blue image 22–26.

Turning now to FIG. 2 a schematic illustration is provided of a representative system for both capturing the necessary four images 20–26 of FIG. 1 from the frame 10 of film 12, and thereafter recombining them as desired in the manner just described to yield an improved image 36. The conceptual effect of the prism 18 will in the embodiment depicted in FIG. 2 be implemented by means of a color wheel 38 having a plurality of optical filters 40, specifically a red, green, blue and infrared filter. A light source such as a lamp 42 provides light in each of these red, green, blue and infrared spectra With each of the appropriate color filters 40 being sequentially interposed between the film 12 and the lamp 42, light in the red, green, blue and infrared spectra will sequentially be caused to impinge upon and be transmitted through the desired frame 10 of the film 12 in sequence and will thence be captured by an appropriate color camera 42, whereupon the video signal 46 thus generated may be delivered to a suitable computer 48.

The process of generating sequential color images may of course be automated as shown generally by the control line 44 from the computer 48 to the image generating component of the system of FIG. 2. The functions which may be controlled by the computer 48 and control line 44 are well known in the art and will thus not be discussed in detail herein. Such functions may include control signals to peripheral devices to sequence advancement of the respective color filters 40 on the color wheel 38, advancement of the film 12 to the desired image 10 and may further include other such controls features as controlling intensity of the lamp 42 for the desired spectral response. A keyboard 52 provides a conventional user interface to the computer and a color monitor 50 is further provided for viewing the various images as desired.

Referring now to FIG. 3 the computer 48 will in a conventional manner include a system bus 54 for providing intercommunication between a microprocessor 56 within the computer and a program 58 and input/output adapter 60. The adapter 60 which may take the form of a video capture card is provided in order to interface with the camera 42 and monitor 50 so as to provide proper digitized image data to be stored in and operated upon by the computer 48. Additional adapters may be provided as desired in order to provide further system control and interfacing as for example in provision of the control signals 44 dependent upon the particular system employed. The computer 48 will desirably include some form of bulk memory capable of storing large amounts of data associated with high resolution digital images such storage being conceptually illustrated in FIG. 3 as the image blocks 62–66. Blocks 62 and 64 are intended to schematically represent the various red, green, blue and infrared images captured from the frame 10 and stored in the form of digitized pixels in memory. In like manner the output image box 66 is intended to functionally represent the recombined visible image 36 as stored in memory after the computer 48 has operated upon the input images 62 and 64 in accordance with the invention. This output image 64 may also preferably be in the form of a plurality of digitized image pixels stored in bulk memory in a manner well known in the art.

Still referring to FIG. 3, the program 58 is intended to represent software necessary for controlling the microprocessor 56 and other components of the system in the desired manner to achieve the objectives described herein. For example, a component of the program 58 may be the control software necessary for generating sequentially the desired red, green, blue and infrared images. Microprocessor 56 under the control of this program 58 will thus generate the required signals on the system bus 54 transmitted to the input/output adapter or adapters 60 for placing appropriate signals or receiving such signals on the lines 44 and 46 which may include data/address/control signals as necessary. Yet an additional component of the program 58 will encode the steps necessary to carry out the processing of the images as herein described.

One representative computerized system for implementing the functions just described relative to FIGS. 2 and 3 would include the following components:

The lamp, filter wheel, film holder, and camera assembly is contained within a Nikon film scanner model LS 3500. The scanner is modified so during the infrared scan the built-in infrared filter is removed, a Kodak Wratten 87C filter inserted in its place, and the voltage on the lamp lowered from the normal 12 volts to 5 volts.

The computer, display and keyboard can be one manufactured by International Business Machines containing a GPIB card manufactured by National Instruments of Austin, Tex. to interface to the film scanner.

Alternately the camera 42 can be a Pulnix monochrome CCD camera model TM34K specially ordered without the built-in infrared absorbing filter, the colored filters 40 include an 87C for infrared and standard colors for the other positions plus added infrared absorbing filters. The arrangement of the wheel, lamp, and film holder should be obvious to one skilled in the art.

Figure 4:
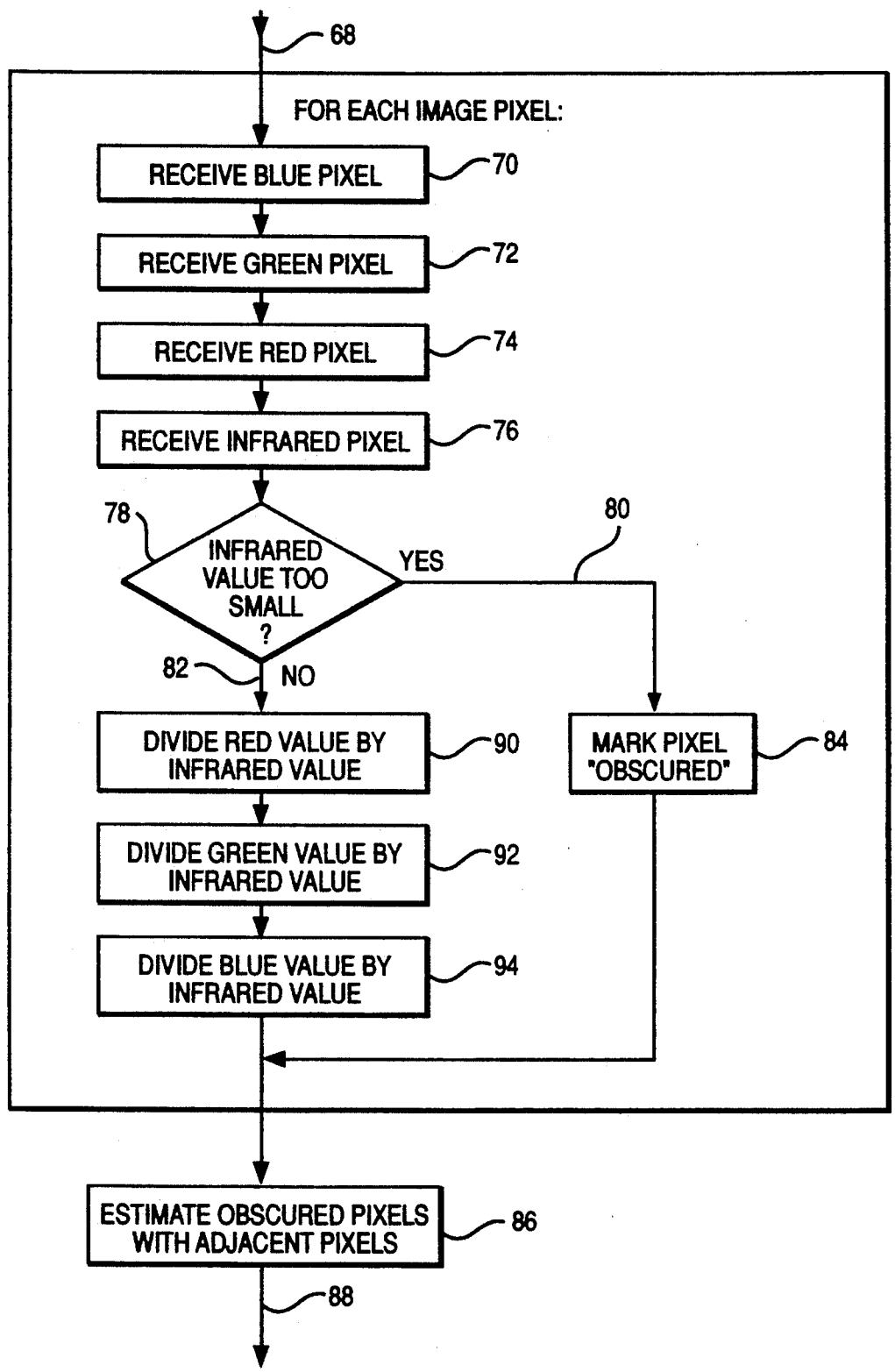
FIG. 4 is a flow diagram indicating a sequence of operation of the system of FIG. 2 in accordance with the invention.

With reference to FIG. 4, the pertinent portion of the program 58 which accounts for the imperfections 16 and the infrared image 20 in processing the various images to result in the desired recombined image 36 will now be described. Once the red, green, blue and infrared images have been digitized and appropriately stored for retrieval, the image processing will commence by retrieving pixel data as shown by arrow 68. Each pixel digitized and captured from the frame 10 will actually include a corresponding red, green, blue and infrared pixel associated with the respective red, green, blue and infrared images 20–26 of FIG. 1. These red, green, blue and infrared pixels corresponding to the same location in the frame 10 will have intensity values associated therewith which under computer control will be stored and retrieved from memory. For each such particular group of pixels the associated value of the corresponding infrared pixel 76 will be compared to a predetermined threshold value as shown by decision tree 78. This threshold valve is selected based on the noise and accuracy of the actual hardware to limit subsequent compensating gain below the point where system noise predominates. This limit is conceptually equivalent to the limit in the automatic gain control (AGC) of a radio receiver.

If the value of this infrared pixel does not equal the predetermined value, the pixels associated with this infrared pixel and corresponding location in the frame 10 are considered to be obscured by an imperfection 16 and this fact is recorded with respect to the pixels as shown at block 84. An appropriate fill routine may then be executed by the system of FIG. 2 to replace the respective red, green, blue and infrared pixel values with corrected estimates therefor more accurately reflecting what the values would be if the corresponding imperfections 16 were absent from the film 12. Such fill-in routines are well known in the art and employ various techniques such as examining values of adjacent pixels in order to extrapolate to an estimated value for the obscured pixel as shown at step 86.

Continuing with FIG. 4, if the pixel value of the particular infrared pixel under examination is equal to or exceeds that of the predetermined value the branch 82 of the decision tree 78 is followed. As previously described, under control of program 58, the computer 48 will thereafter adjust the corresponding red, green and blue pixel values retrieved in blocks 70-74 by values functionally related to that of the infrared pixel intensity as shown at blocks 90-94. It will be recalled that because the imperfections 16 will essentially due to their uniform transmissivity across the visual spectrum, manifest themselves as dimmed areas perceived in the red, green and blue records, these intensities, must be appropriately intensified so that the areas associated with the imperfections will be in harmony with those of immediately adjacent pixels, thereby reducing the perception of these imperfections in the enhanced image 36. Details of the precise mathematical operation in which the red, green and blue values are "divided" by the infrared value of the corresponding pixel will be hereinafter described in greater detail.

Once each red, green and blue pixel has been compensated for the effect of the imperfections 16 by division in accordance with blocks 90-94, or marked as observed by block 84, the estimation or fill-in techniques (block 86) may be employed for the pixels marked observed. The subroutine is then exited at 88. When the foregoing process has been completed for all captured pixels of a frame 10, a resulting output visible image record 66. FIG. 3, is thereby generated comprised of red, green and blue digitized images each comprised of its respective collection of pixels thus adjusted as required in accordance with the process of FIG. 4. These corrected red, green and blue images may thereafter be selectively recovered on the system bus 54 from memory under control of microprocessor 56 and thereafter output through the I/O adapter 60 in appropriate form whereby they may be combined as, for example, in the monitor 50 so as to display the desired recombined and enhanced image 36 devoid of the deleterious visual affect of the imperfections 16.

Figure 5:
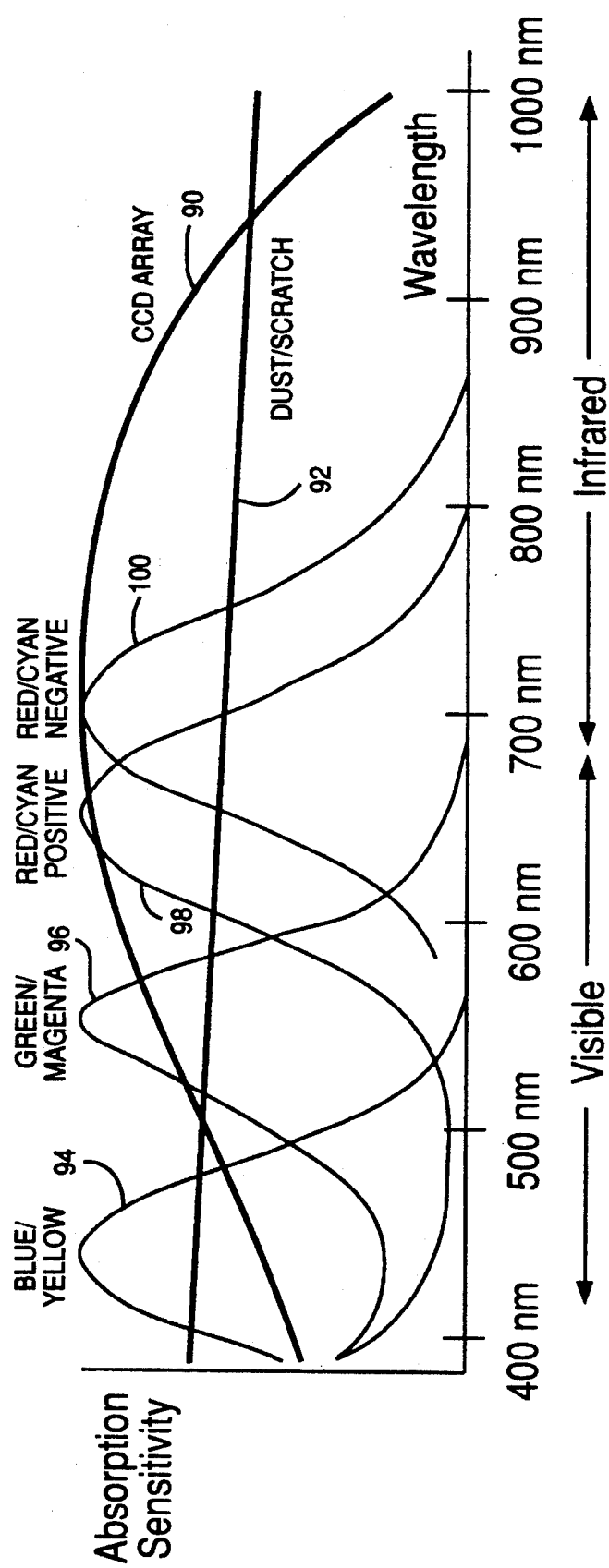
FIG. 5 is an illustration of various frequency response signatures associated with aspects of the invention including that of recording media imperfections, a typical array for capturing images from the medium, and that of various dyes associated with the dye-based film-type form of the recording medium.

Now that a general understanding has been provided of the operation of the invention, a more detailed description of important aspects thereof follows. Numerous factors must be accounted for in a practical image enhancement system relating to limitations and non-linearities of the real world which result in compromises over ideal theoretical systems. FIG. 5 shows the relative absorption of dyes and imperfections such as dust and scratches, and relative sensitivity of image capture sensors and transducers such as charge coupled device (CCD) arrays to various frequencies of light, where the ordinant is the measure of relative percentage of absorption or for the sensor, sensitivity, and the abscissa is the light wavelength in nanometers. Dye colors are labeled with two names, for example "red/cyan" dye is formed by the red sensitive layer to absorb red light therefore appears cyan in color.

Several things may be noted from FIG. 5. First, as previously described imperfections 16 such as dust and the like exhibit substantially uniform absorption of light across the visible range between approximately 400-700 nanometers and into the infrared spectrum from about 700 nanometers on up. Accordingly the graphical depiction of absorption of these imperfections is substantially flat as shown at reference numeral 92. Because the primary effect from most imperfections is refraction, and refraction is slightly less at longer wavelengths, the effect of most imperfections will be slightly less at longer wavelengths, shown in FIG. 5 as a slight tilt to absorption curve 92. Moreover, as mentioned in the background of the invention, a more diffuse light, referred to in microscopy as a light with a larger "numerical aperture", or NA, will also lower the effect of refraction-induced defects. Thus by constructing an illumination source that is less diffuse, or of a lower NA, in the red and especially infrared, and slightly more diffuse in the green, and especially blue, the tilt of absorption curve 92 may be removed.

The invention has particular application in dye-based films. However, unique properties associated with such dyes create problems which must be accounted for. For example, referring to FIG. 5, one characteristic of these dyes is that some cyan dyes absorb some infrared. Cyan dyes used in positive transparencies are designed to work with the human visual system, and accordingly are permitted to open up rapidly even in the near infrared, as shown by the positive transparency red/cyan dye response curve 98. On the other hand, cyan dyes utilized in negatives typically work with colored paper having a cyan-forming layer sensitive almost into near infrared, and accordingly one must go further into the infrared for these negative cyan dyes to become transparent. This is demonstrated by the spectral response curve of red/cyan dyes utilized for negatives reference numeral 100.

Also shown in FIG. 5 is a light frequency response curve 90 of a charged couple device array which is a typical transducer for capturing light images both in the visible and infrared spectra. Such a device might typically be found in the camera 42 of FIG. 2 for capturing the red, green, blue and infrared images. It will be plainly seen from the spectrum 90 there is no problem electronically in "seeing" infrared as the sensitivity of such arrays extend into the infrared spectrum and in fact frequently require eliminating the invisible infrared from a color image. As shown in the response 90, such CCD sensors are often more sensitive to infrared than visible light, and thus may adequately be employed to derive the desired infrared image 20 of FIG. 1 when the frame 10 is illuminated with an incandescent form of lamp 42 which puts out most of its radiance in the infrared.

A problem in implementing the system of FIG. 2 might arise if a cold light source is employed exclusively as the lamp 42 or if an infrared absorbing filter is mechanically built into the light sensor of the camera 42, as it would in, for example, in a single chip color CCD array. Optically, such CCD sensors permit more light piping in the infrared, softening the image and possibly requiring a software boost of high spatial frequencies to renormalize it to the visible acutance. Lenses associated with the camera 42 also focus differently in the infrared, although this problem may be minimized with apochromats or may be eliminated by simply refocusing slightly, which may even be done through computer control on the I/O control line 44 automatically. Lateral color distortions are also potential problems with asymmetric lens designs which may be solved by software micro resizing or by using a symmetric lens design. It has been found in practice that such lens focus problems are small enough to ignore within 100 nanometers of the visible spectrum. Also referring to FIG. 5, it will be noted that conventional blue/yellow dye spectra such as the representative spectrum 94 and green/magenta spectra such as that shown at reference numeral 96 do not absorb in the infrared region.

It will be recalled that it is a principle of the invention that the infrared record will include data only associated with the location of the undesirable imperfections 16. These imperfections 16, because of the essentially flat transmissivity curve 92 thereof extending into the visible region will cause perceptible imperfections to appear in the respective blue, green and red images as darkened areas. However, because an infrared record exists mapping the locations and darkness of these imperfections, this information in the infrared map may be utilized to compensate out the imperfections appearing in the blue, green and red images. One purpose in providing FIG. 5 is to illustrate that in a non-linear world, to compensate these imperfections, a practical system of the invention must account for these non-linearities and irregularities in dye and senor response optics, etc. Thus, choosing the wavelength to capture the infrared record is in itself a compromise as may be understood from the foregoing. If cut too close to the visible spectrum, excessive crossover from the cyan dye record will cause problems in the separation. On the other hand if cut too far into the infrared, the optical problems previously mentioned are made worse. Accordingly, it has been found in practice that a low pass filter below 750 nanometers is a good compromise. The blue sensor will see some of the magenta and cyan record as well as the yellow record it is supposed to see. Similarly, the infrared sensor will see some of the cyan record as well as the "dust" record it is supposed to see.

From the four sensor variables it is of course desired to find the "pure" original red green and blue records having information associated with the "pure" image, and further to derive a dust record devoid of all image information. In algebraic terminology, this suggests four variables and four unknowns. Although there are non-linearities in implementing the system of the invention as just described, in one embodiment acceptable separation may actually be accomplished even by applying a simpler linear algebra routine utilizing a predetermined 4×4 matrix as shown in FIG. 6.

Figure 6:
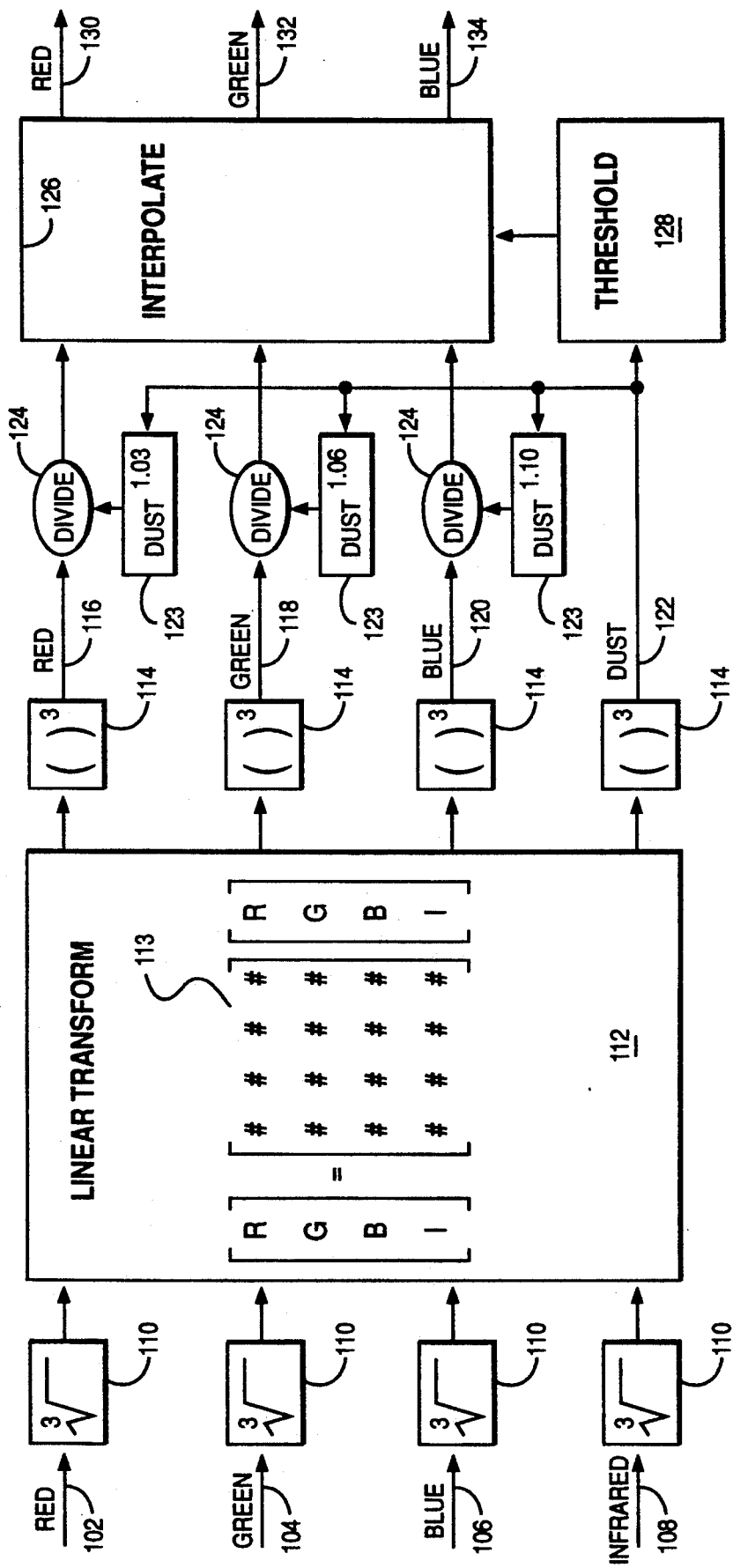
FIG. 6 is a schematic illustration of image processing steps carried out by the system of FIG. 2 which comprise a portion of the flow diagram of FIG. 4.

Referring in more detail to FIG. 6 the purpose of this figure is to illustrate given the foregoing discussion of non-linearities and the real world, that the image processing, once the red, green and infrared records have been derived, may take a number of forms in co-relating the infrared to the respective red, green and blue records in a manner determined by the particular system being employed and the results desired. Specifically, the invention admits to a linear algebra matrix approach in its simplest form but contemplates other processing routines as well.

Referring in more detail to FIG. 6, the values of individual pixels for each pixel location associated with the frame 10 will preferably be operated upon by the system of FIG. 2 and specifically the microprocessor 56. Each value of red, green, blue and infrared 102-108 associated with a particular pixel will in one implementation have the cube root thereof obtained as shown in block 110, whereupon the results will be operated upon by a linear transform 112. The reason for the linear transform 112 is to simplify the matrix algebra so the calculations may be done faster on a computer. The coefficients 113, will, in one embodiment, be selected using method of linear algebra to provide independence of all four colors near a selected reference, such as gray. The resulting outputs of the transform 112 will then be cubed as shown by boxes 114 resulting in red, green, blue and infrared values 116-122, respectively. Once these cubed values 116-122 have been obtained, to transform from the cube root domain in which the matrix was applied, the result for the imperfection or dust record 122 for the particular pixel in question will be employed as shown by the divide functional boxes 124 to reduce or divide out the effect of the imperfections in the red, green and blue records. The gain of the dust record 122 may be adjusted slightly to match the refraction of each color with gamma gain boxes 123. These values are then directly output as R, G, B values 130-134 in the absence of interpolation 126.

As shown in FIG. 4, if the value for a given pixel in the infrared record, 122, is tested as shown in the threshold box 128 and is found to be below the threshold of acceptable recovery this signifies that the particular pixel is obscured, thereby activating an appropriate interpolation or fill-in routine 126 instead of the divide functions 124 to adjust the values for the red, green and blue pixels in accordance with values for adjacent pixels, thereby resulting in the correct red, green and blue pixel values 130-134. The interpolate box 126 receives outputs from divide 124 so that fringe areas of the imperfection that are partially, but not totally occluded may be used in the estimate. This will be covered later in more detail referring to FIGS. 7 and 9.

Separation with a linear matrix 113 is an expedient greatly simplifying computation, however such an assumption of linearity introduces errors in areas of color. These errors can be reduced to the point of insignificance by applying matrix multiplication in a domain of selected non-linearity. To select this linearity, several cases may be considered. First, in cases in which it is assumed the dyes may have a perfect square spectral response, e.g. they completely transmit some wavelengths and absorb a fraction of light at other wavelengths independent of wavelength. In this case it may be further assumed that each color sensor in the camera 42 may have a response covering some broad range of wavelengths, as they typically do in the real world. In such a case just described, a linear form of the matrix 112 separates out effects of the imperfections perfectly when applied in the linear domain.

However, in yet another case in modeling to take into account non-linearities, it may in some instances be assumed that absorption of the dyes varies with wavelengths, as in fact is more typical. In some cases it may further be assumed that the color sensors are sensitive only to one wavelength as they would be, for example, if the scanning system of FIG. 2 employed four colored lasers as light sources. In this latter case, the linear matrix 112 separates perfectly when applied in the logarithmic domain.

Yet an additional case may be considered wherein dye sensitivity varies with wavelength and sensors cover some broad range of wavelengths. The linear matrix 112 may not separate perfectly but nevertheless may function sufficiently to achieve effectively perfect separation of the effects of the imperfections 16 if applied in a domain between the linear and logarithmic. For this preferred embodiment, the cube root domain as shown in FIG. 6 has been employed and appears to work quite well.

The infrared or "dust" record absorbs wavelengths so uniformly as to fall into the first case most typically, and thus is best separated from the color records by a linear subtraction in the logarithmic domain. This is precisely a division in the linear domain and as such is shown by division blocks 124 in FIG. 6. Thus, the dye records are subtracted from the dust record in the cube root domain, and then the dust record is divided from the dye records in the linear domain. If the tilt of the dust/scratch absorption 92 is not compensated with variable diffusion as mentioned earlier in the specification then the effect of imperfections will be slightly greater in the blue image than in the red image. To compensate this, the dust pixel valve 122 can be raised to a power "gamma" prior to dividing the red, green, and blue image. Typically the best "gamma" for red is 1.03 for green. 1.06, and for blue, 1.1.

However, when the dust record falls below a predetermined threshold as indicated at block 128, interpolation may be used in place of division. It has been found that a pyramid interpolation will in practice remove small imperfections to the point of invisibility. Large imperfections on the other hand may be masked by an algorithm which duplicates texture as well as density across the defect such as a fractal generator. However, employing such a technique may be desirable only in the case of extremely large defects.

Turning now to FIGS. 7-9, these figures are intended to illustrate comparatively the results of image enhancement employing prior art methods with those of the present invention. In these figures, an identical desired image 136 is stored. A piece of film 139 contains a defect 138 obscuring portions of the desired image 136. The defect 138 in turn is comprised of a region 142 that only partially obscures the image 136, typically caused by the blurring of the defect lying on the surface of the film out of the image plane or by a soft edge of the defect itself, and may contain a core region 144 that totally obscures the image 136.

Such defects 138 are typically sought to be eliminated in prior art by the process first of detection followed by interpolating in the area detected as being defective based upon adjacent image information in order to mask the defect. The results of two prior art methods of attempting to effect corrections are shown in FIGS. 8A and 8B. In the first method of FIG. 8A, a human observer would point to the defect 138 with an airbrush and identify a defective area for example in the shape of a disk 146 of FIG. 8A. The obvious problem with this approach in identifying the area 146 of the defect 138 in such a manner for purposes of subsequent manual or automated fill-in correction, is that it masks not only the defect 138 but portions of the desired image 136 as well, thus subsequent interpolation would remove most of the desired image 136 along with the defect.

In yet another prior art method, of FIG. 8B the actual specific boundary and area partially obscured by the defect 138 is found either automatically, e.g. algorithmically, or by painstaking outlining of the defect on an enlarged projection of the image or in the common art, by painstakingly applying a brush to the image under magnification. However, such an approach also has a serious drawback, referring to the right portion of FIG. 8B, that although the area 148 is less than that of the disk 146 which will be corrected algorithmically or manually (and thus less of the desired image 136 is lost). nevertheless a substantial portion of the desired image 136 is still lost in masking the defect, so the reconstruction of the desired image 136 will be imperfect.

Finally, with reference to the present invention, it will be recalled that one significant benefit of mapping the film with infrared is so as to provide an infrared record which is a map of the precise location and boundary of the defects. Accordingly, in FIG. 9, with the infrared map, the outer portion 142 (FIG. 7) of the defect 138 which only partially obscured the image may be restored by the infrared division taught in this patent, leaving only that portion 150 which totally occludes the image. Thus the partially obscured regions 142 may be fully restored wit accuracy, leaving only the totally obscured core region 150 that requires the aforementioned algorithmic fill-in. Because this latter region 150 is small, little image detail is lost. Thus, the image interpolation across the smaller core can be more accurate because the image is known close to the area that must be interpolated.

Additional aspects of the invention may be noted. First, it has been found that even fresh film may contain surface waves and included bubbles which, although not giving rise to immediately apparent imperfections and artifacts in captured images nevertheless contribute to apparent graininess in "unblemished" film. By application of the invention as herein described it has been found that reduction in apparent graininess to even such film may be achieved. It has further been found that benefits of the invention may be achieved essentially with all dye-based films including chromogenic black and white films. Moreover, although in the embodiment depicted herein, the sequential images captured have been digitized in part for convenience in subsequent processing in the manner of the invention, the invention is not intended to be so limited and contemplates application also in the analog domain As an example of a specific application in which defects occur within the medium rather than the surface, consider the scanning of prints using transmitted light. When viewed by transmitted light, shadow detail is clearly visible that is too dark to be detected through surface noise by reflected light. In the prior art such transmission scanning was rendered useless by the random grain of the fiber base, however with the current invention the paper fibers in the base may be effectively removed from the image along with other non-dye defects providing a better way to capture a wider brightness range from prints than is possible in the current art. Accordingly, for the purposes of this invention, we consider "film" to be any transmissive substrate on which an image is layed.

It is also not a limit to use transmitted light. When viewed under reflected infrared light, prints appear white with dust, scratches, and other surface defects clearly visible. By clearly distinguishing defects from image detail, and mapping these known defects to the visible image, the visual effect of the defects may be removed.

Moreover, a benefit of the invention is achieved by ensuring that the red, green, blue and infrared records are all captured by employing substantially the same optical path, e.g. from the incident light originating from the light source 42 through each selected filter 40, thence through the frame 10 of the film 12 to the camera 42 or other sensor. In this manner, one may be assured that each of the red, green, blue and infrared images will be in registry, thereby facilitating ease of correlating pixels in each of these records to light emanating from the same location on the frame 10 whereupon they may be more efficiently processed.

In the embodiment depicted herein light of the various spectra has been transmitted through the film 12 and is collected on the opposing side thereof. However, the invention is not intended to be so limited to collection of light energy transmitted through the medium for which correction of imperfections is desired. Thus the invention admits to applications wherein, for example, the sensor such as camera 42 is on the same side of the medium as the source of light intended to illuminate the medium 12, whereby the red, green, blue and infrared images may be captured from reflection from the surface of the medium 12. In such an instance, the sensor or camera 42 may not be in coaxial alignment with the medium 12 and light source 42 as in the case of the system of FIG. 2 but rather may be off to one side of the light source. Nevertheless, it would still be desirable to illuminate the medium 12 with various light frequencies such as by laser illumination, gas discharge, LED (light emitting diode) or with the previously described color filters so that the red, green and blue and infrared images would then be gathered by light travelling along essentially the same optical path for each group of such images for the noted reason of facilitating registry of image and defect refraction and subsequent processing of the red, green, blue and infrared pixels of the corresponding red, green, blue and infrared images associated with a particular location on the medium 12.

The preferred embodiment has described sequential capture of red, green, blue and infrared. It should be obvious that one could obtain the four images simultaneously using white light containing all colors by extending standard 3-color camera technologies to 4-colors. An example of this would be to use a 4 line CCD sensor with filters built over the lines to pass separately red, green, blue, and infrared, or a 4-chip camera using dichromic mirrors to separate red, green, blue, and infrared images separately on the 4 chips.

Any of the elements used to recover the image without defects may be implemented in analog circuitry or by using an analog-to-digital converter with digital hardware, or even with software running on a computer or a digital signal processor (DSP). Also the several elements, such as capturing the red, green, blue, and infrared images, and processing the results, can be done serially or in parallel. Although the discussion has assumed serial capture of images to a computer memory for processing, in certain fields other structures are preferred. For example, in film-to-video transcription, a color camera with a fourth infrared sensor outputs the red, green, blue, and infrared signals to analog circuitry that substantially divides the red, green, and blue by the infrared providing in real time removal of scratches, dust, fungus growth, fingerprints, transparent-type splices, and other imperfections. With the advent of HDTV, removal of all dust and hairline scratches will be much more critical than it is today.

While the invention has been shown and described with reference to particular embodiments thereof, it will be understood by those skilled in the art that the foregoing and other changes in form and detail may be made therein without departing from the spirit and scope of the invention.

I claim:

1. Method for use in correcting for the effects of storage medium imperfections on an image stored therein comprising
    directing infrared energy to said medium;
    detecting energy in the infrared spectrum from said medium resulting from said directed infrared energy corresponding to said imperfections;
    mapping said imperfections from said detected energy;
    directing energy from the visible portion of said electromagnetic spectrum to said medium; and
    detecting energy from said visible portion of said electromagnetic spectrum from said medium in response to said directing of energy from said visible portion of said electromagnetic spectrum.

2. The method of claim 1 wherein said steps of directing and detecting energy from said visible portion of the electromagnetic spectrum comprises sequentially in any order, directing red, green, and blue light at said medium and then
    detecting a corresponding red, green, and blue image from said medium.

3. The method of claim 1 wherein at least a portion of detected energy from said infrared and said visible portions of said electromagnetic spectrum were transmitted through said medium.

4. The method of claim 1 wherein said directing of said energy from said infrared and said visible portions of the electromagnetic spectrum are along substantially the same optical path.

5. The method of claim 1 wherein said detecting of energy from said infrared and said visible portions of the electromagnetic spectrum are along substantially the same optical path.

6. The method of claim 1 wherein said detected infrared energy from said medium is reduced by said imperfections.

7. Method for use in correcting for the effects of storage medium imperfections on an image stored therein comprising
    directing infrared energy to said medium; .
    detecting energy in the infrared spectrum from said medium resulting from said directed infrared energy corresponding to said imperfections; and
    mapping said imperfections from said detected energy;
    directing non-infrared energy from said medium;
    generating a second image from said detected infrared and detected non-infrared energy;
    generating a corresponding infrared image and plurality of non-infrared images from said medium; and further wherein said second image is a combination of said infrared image and said plurality of non-infrared images.

8. The method of claim 7 wherein said non-infrared energy is from the visible portion of said electromagnetic spectrum.

9. The method of claim 7 wherein said detected infrared and detected non-infrared energy are detected in registry.

10. The method of claim 7 wherein said non-infrared images comprise images from red, green, and blue portions of the electromagnetic spectrum.

11. The method of claim 7 wherein said infrared image is functionally related to measurements of said infrared energy attenuated by said imperfections, and wherein said step of generating said second image comprises adjusting said plurality of non-infrared images in response to said measurements.

12. The method of claim 11 wherein said infrared image and said image are comprised of corresponding first and second pluralities of pixels, and wherein said adjusting step further comprises the steps of generating, for each pixel of said first plurality, a number functionally related to the infrared value of said pixel; and multiplying, for each pixel of said second plurality, the magnitude of said pixel of said second plurality by a corresponding said number corresponding to a pixel of said first plurality.

13. The method of claim 12 wherein said functional relationship is substantially a reciprocal.

14. Apparatus for use in correcting for the effects of recording medium imperfections on an image stored therein, comprising the steps of means for generating an infrared image of said medium containing indications of imperfections with respect to said medium; and means for generating from said infrared image and said stored image a second image;

means for detecting non-infrared energy from said medium, and wherein said means for generating said second image comprises means for generating said second image from said infrared image and said detected non-infrared energy from said medium;

means for directing infrared energy to said medium; and wherein said means for generating an infrared image generates said infrared image in response to portions of said infrared energy from said medium; and means for directing energy from the visible portion of said electromagnetic spectrum to said medium; and wherein said means for detecting non-infrared energy comprises means for detecting energy from said visible portion of said electromagnetic spectrum from said medium in response to said means for directing of energy from said visible portion of said electromagnetic spectrum.

15. The apparatus of claim 14 wherein said non-infrared energy is from the visible portion of said electromagnetic spectrum.

16. The apparatus of claim 14 wherein said means for directing and detecting energy from said visible portion of the electromagnetic spectrum comprise, respectively, means for directing red, green, and blue light at said medium; and means for detecting a corresponding red, green, and blue image from said medium.

17. The apparatus of claim 14 wherein said means for directing said infrared energy and said energy from said visible portions of the electromagnetic spectrum transmit respective said energy along substantially an identical optical path.

18. The apparatus of claim 17 wherein said means for directing said infrared energy and said energy from said visible portion of said electromagnetic spectrum include a numerical aperture that varies with wavelength.

19. The apparatus of claim 17 wherein said means for detecting of energy from said infrared and said visible portions of the electromagnetic spectrum detect said respective energy along substantially coaxial optical paths.

20. Apparatus for use in correcting for the effects of recording film medium imperfections on an image stored therein, comprising the steps of means for generating an infrared image of said medium containing indications of imperfections with respect to said medium; and means for generating from said infrared image and said stored image a second image.

21. The apparatus of claim 20 wherein said film contains image information stored as a dye image.

22. The apparatus of claim 20 wherein said imperfection is a surface defect on said medium.

23. Apparatus for use in correcting for the effects of substantially reflective recording film medium imperfections on an image stored therein, comprising the steps of means for generating an infrared image of said medium containing indications of imperfections with respect to said medium; and means for generating from said infrared image and said stored image a second image.

24. The apparatus of claim 23 wherein said medium is a print.

25. The apparatus of claim 23 wherein said imperfection is a defect at least partially within said medium.

26. Apparatus for use in correcting for the effects of recording film medium imperfections on an image stored therein, comprising the steps of means for generating an infrared image of said medium containing indications of imperfections with respect to said medium; and means for generating from said infrared image and said stored image a second image and wherein means for generating said infrared image substantially excludes infrared energy from said imperfections.

27. The apparatus of claim 26, wherein said imperfections deflect said infrared energy sufficiently to form indications of said imperfections in said infrared image.

28. Apparatus for use in correcting for the effects of recording film medium imperfections on an image stored therein, comprising the steps of means for generating an infrared image of said medium containing indications of imperfections with respect to said medium; and means for generating from said infrared image and said stored image a second image and wherein said means for generating said second image further comprises means for detecting infrared and non-infrared energy, and comprises means for generating plurality of non-infrared images from said medium; and further wherein said second image is a combination of said infrared image and said plurality of said non-infrared images.

29. The apparatus of claim 28 wherein said means for generating said plurality of non-infrared images comprise means for generating images from red, green, and blue portions of the electromagnetic spectrum.

30. Apparatus for use in correcting for the effects of recording film medium imperfections on an image stored therein, comprising the steps of means for generating an infrared image of said medium containing indications of imperfections with respect to said medium; and means for generating from said infrared image and said stored image a second image and wherein said imperfections substantially prohibit transmission of infrared energy therethrough.

31. Apparatus for use in correcting for the effects of recording film medium imperfections on an image stored therein, comprising the steps of
means for generating an infrared image of said medium containing indications of imperfections with respect to said medium; and
means for generating from said infrared image and said stored image a second image and wherein said imperfections partially prohibits transmission of said infrared energy therethrough.

32. The apparatus of claim 31 wherein said means for generating an infrared image includes means for storing indications of location of said imperfections with respect to said medium.

33. Apparatus for use in correcting for the effects of recording film medium imperfections on an image stored therein, comprising the steps of
means for generating an infrared image of said medium containing indications of imperfections with respect to said medium; and
means for generating from said infrared image and said stored image a second image and wherein said imperfections are comprised of a first portion substantially impeding transmissions of said infrared energy therethrough; and
a second portion only partially impeding transmission of said infrared energy therethrough.

34. The apparatus of claim 33 wherein said means for generating an infrared image includes means for storing data from which spatial position, shape, and/or size of said imperfections may be determined.

35. Apparatus for use in correcting for the effects of recording film medium imperfections on an image stored therein, comprising the steps of
means for generating an infrared image of said medium containing indications of imperfections with respect to said medium; and
means for generating from said infrared image and said stored image a second image and wherein said means for generating an infrared image further includes
means for storing information functionally related to the intensity and location of said infrared energy passing through respective locations on said medium.

36. Apparatus for use in correcting for the effects of recording film medium imperfections on an image stored therein, comprising the steps of
means for generating an infrared image of said medium containing indications of imperfections with respect to said medium; and
means for generating from said infrared image and said stored image a second image wherein said infrared image is functionally related to measurements of said infrared energy attenuated by said imperfections; and wherein said means for generating said second image comprises
means for adjusting said plurality of non-infrared images in response to said measurements.

37. The apparatus of claim 36 wherein said infrared image and said second image are comprised of corresponding first and second pluralities of pixels, and wherein said means for adjusting further comprises
means for generating for each pixel of said first plurality a number functionally related to the infrared value of said pixel; and
means for multiplying, for each said pixel of said second plurality, the magnitude of said pixel of said second plurality by a corresponding said number corresponding to a pixel of said first plurality.

38. The apparatus of claim 37 wherein said functional relationship is substantially a reciprocal.

39. Method for use in correcting for the effects of storage medium imperfections on an image stored therein comprising
directing infrared energy to said medium;
detecting energy in the infrared spectrum from said medium resulting from said directed infrared energy corresponding to said imperfections;
mapping said imperfections from said detected energy;
detecting non-infrared energy from said medium; and
generating a second image from said detected infrared and detected non-infrared energy, and wherein said imperfection deflects infrared energy transmitted therethrough so as to be partially excluded from said detected energy.

40. Method for use in correcting for the effects of storage medium imperfections on an image stored therein comprising
directing infrared energy to said medium;
detecting energy in the infrared spectrum from said medium resulting from said directed infrared energy corresponding to said imperfections;
mapping said imperfections from said detected energy;
detecting non-infrared energy from said medium; and
generating a second image from said detected infrared and detected non-infrared energy, and wherein said imperfection partially refracts said infrared energy transmitted therethrough.

41. Method for use in correcting for the effects of storage medium imperfections on an image stored therein comprising
directing infrared energy to said medium;
detecting energy in the infrared spectrum from said medium resulting from said directed infrared energy corresponding to said imperfections;
mapping said imperfections from said detected energy;
detecting non-infrared energy from said medium;
generating a second image from said detected infrared and detected non-infrared energy and wherein said imperfections are comprised of a first portion substantially deflecting infrared energy transmitted therethrough so as to be substantially excluded from said detected energy; and
a second portion only partially deflecting infrared energy transmitted therethrough whereby only a portion of said infrared energy transmitted through said second portion is in said detected energy; and wherein said generating said second image includes estimating occluded portions of said image based on areas of said image partly occluded and recovered.

* * * * *

UNITED STATES PATENT AND TRADEMARK OFFICE
CERTIFICATE OF CORRECTION

PATENT NO.        : 5,266,805
APPLICATION NO.  : 07/878587
DATED            : November 30, 1993
INVENTOR(S)      : Albert D. Edgar It is certified that error appears in the above-identified patent and that said Letters Patent is hereby corrected as shown below:

Column 8, at line 60, delete "valve" and insert --value-- in its place.

Column 9, at lines 37 and 39, delete "observed" and insert --obscured-- in its place.

Signed and Sealed this

Eighth Day of July, 2008

JON W. DUDAS
*Director of the United States Patent and Trademark Office*

(12) EX PARTE REEXAMINATION CERTIFICATE (6489th)
United States Patent
Edgar

(10) Number: US 5,266,805 C1
(45) Certificate Issued: Oct. 28, 2008

(54) SYSTEM AND METHOD FOR IMAGE RECOVERY

(75) Inventor: Albert D. Edgar, Austin, TX (US)

(73) Assignee: Eastman Kodak Company, Rochester, NY (US)

Reexamination Request:
No. 90/008,141, Aug. 2, 2006

Reexamination Certificate for:
Patent No.: 5,266,805
Issued: Nov. 30, 1993
Appl. No.: 07/878,587
Filed: May 5, 1992

(51) Int. Cl.
*H04N 9/11* (2006.01)
*H04N 3/36* (2006.01)
*H04N 5/253* (2006.01)
*H04N 1/409* (2006.01)

(52) U.S. Cl. .................. 250/330; 250/341.7; 250/341.8; 348/E3.002; 348/E5.049; 348/E9.009; 382/275; 396/309

(58) Field of Classification Search .................. None
See application file for complete search history.

(56) References Cited

U.S. PATENT DOCUMENTS 5,041,866 A * 8/1991 Imoto .......................... 355/38
5,103,490 A * 4/1992 McMillin ..................... 382/284
5,130,789 A * 7/1992 Dobbs et al. ................. 358/500
5,517,575 A * 5/1996 Ladewski .................... 382/108

FOREIGN PATENT DOCUMENTS

| EP | 0101180 | * 2/1984 |
| GB | 1 547 812 | 6/1979 |
| GB | 2 140 245 A | 5/1983 |

* cited by examiner

*Primary Examiner*—Fred Ferris

(57) ABSTRACT

A system and method to compensate for effects of a recording medium such as film on image data retrieved therefrom. Red, green, blue, and infrared light is sequentially transmitted through film having an image exposed therein to the system which captures corresponding images. The infrared image maps the location, boundaries and intensities of the media defects. The map is employed combinatorially with the other captured images resulting in an image from the film free of the effects of the film defects. In one embodiment the effects of the imperfections are divided out from the red, green, blue spectra in an operation dividing out the infrared image data on a pixel-by-pixel basis. In an alternate embodiment wherein the imperfections substantially prevent transmission of IR light therethrough, the IR image map of the defects is nevertheless employed with an automated fill-in algorithm more effectively utilized due to the precision with which the defect boundaries are known.

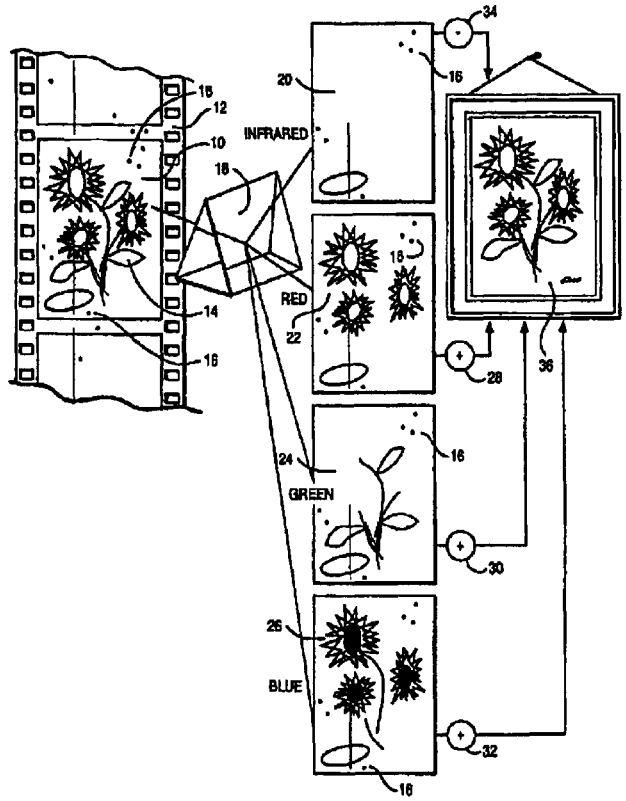

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 14, 20 and 26 are cancelled.

Claims 3, 4, 6, 8, 10, 15, 22 and 27 are determined to be patentable as amended.

New claims 42–96 are added and determined to be patentable.

Claims 2, 5, 9, 11–13, 16–19, 21, 23–25 and 28–41 were not reexamined.

3. The method of claim [1] *42* wherein at least a portion of detected energy from said infrared and said visible portions of said electromagnetic spectrum were transmitted through said medium.

4. The method of claim [1] *42* wherein said directing of said energy from said infrared and said visible portions of the electromagnetic spectrum are along substantially the same optical path.

6. The method of claim [1] *42* wherein said detected infrared energy from said medium is reduced by said imperfections.

8. The method of claim [7] *43* wherein said non-infrared energy is from the visible portion of said electromagnetic spectrum.

10. The method of claim [7] *43* wherein said non-infrared images comprise images from red, green, and blue portions of the electromagnetic spectrum.

15. The apparatus of claim [14] *44* wherein said non-infrared energy is from the visible portion of said electromagnetic spectrum.

22. The apparatus of claim [20] *45* wherein said imperfection is a surface defect on said medium.

27. The apparatus of claim [26] *46,* wherein said imperfections deflect said infrared energy sufficiently to form indications of said imperfections in said infrared image.

*42. Method for use in correcting for the effects of storage medium imperfections on an image stored therein comprising*

*directing energy from the infrared portion of the electromagnetic spectrum to said medium;*

*detecting energy from said infrared portion of the electromagnetic spectrum in the form of digitized pixels from said medium resulting from said directed infrared energy corresponding to said imperfections;*

*directing energy from the visible portion of said electromagnetic spectrum to said medium;*

*detecting energy from said visible portion of said electromagnetic spectrum in the form of digitized pixels from said medium corresponding to said stored image including said imperfections in response to said directing of energy from said visible portion of said electromagnetic spectrum;*

*accounting for limitations, non-linearities or irregularities encountered in detecting the infrared energy from said medium by non-linear processing of the detected infrared and visible digitized pixels; and*

*creating a map of the infrared record from the detected energy which identifies the location and boundary of said imperfections in and on said medium substantially devoid of image information.*

*43. Method for use in correcting for the effects of storage medium imperfections on an image stored therein comprising*

*directing infrared energy to said medium;*

*detecting energy in the infrared spectrum in the form of digitized pixels from said medium resulting from said directed infrared energy corresponding to said imperfections;*

*directing non-infrared energy to said medium;*

*detecting energy in the non-infrared spectrum in the form of digitized pixels from said medium resulting from said directed non-infrared energy corresponding to said stored image including said imperfections;*

*accounting for limitations, non-linearities or irregularities encountered in detecting the infrared energy from said medium by non-linear processing of the detected infrared and non-infrared digitized pixels;*

*creating a map of the infrared record from the detected energy which identifies the location and boundary of said imperfections in and on said medium substantially devoid of image information;*

*generating a corresponding infrared image and plurality of non-infrared images from said medium; and further generating a second image from said detected infrared and detected non-infrared energy, wherein said second image is a combination of said infrared image and said plurality of non-infrared images.*

*44. Apparatus for use in correcting for the effects of recording medium imperfections on an image stored therein, comprising*

*means for generating an infrared image of said medium containing indications of imperfections with respect to said medium by creating a map of digitized pixels identifying the location and boundary of the imperfections in and on said medium substantially devoid of image information;*

*means for accounting for limitations, non-linearities or irregularities encountered in detecting infrared energy from said medium by non-linear processing of detected infrared and non-infrared digitized pixels; and*

*means for generating from said infrared image and said stored image a second image;*

*means for detecting non-infrared energy in the form of digitized pixels from said medium, and wherein said means for generating said second image comprises means for* generating said second image from said infrared image and said detected non-infrared energy from said medium;

means for directing infrared energy to said medium; and wherein said means for generating an infrared image generates said infrared image in response to portions of said infrared energy from said medium; and means for directing energy from the visible portion of the electromagnetic spectrum to said medium; and wherein said means for detecting non-infrared energy comprises means for detecting energy in the form of digitized pixels from said visible portion of said electromagnetic spectrum from said medium in response to said means for directing of energy from said visible portion of said electromagnetic spectrum.

45. Apparatus for use in correcting for the effects of recording film medium imperfections on an image stored therein, comprising means for generating an infrared image of said medium containing indications of imperfections with respect to said medium by creating a map of digitized pixels identifying the location and boundary of the imperfections in and on said medium substantially devoid of image information;

means for accounting for limitations, non-linearities or irregularities encountered in detecting infrared energy from said medium by non-linear processing of detected infrared and non-infrared digitized pixels; and means for generating from said infrared image and said stored image a second image.

46. Apparatus for use in correcting for the effects of recording film medium imperfections on an image stored therein, comprising means for generating an infrared image of said medium containing indications of imperfections with respect to said medium by creating a map of digitized pixels identifying the location and boundary of the imperfections in and on said medium substantially devoid of image information;

means for accounting for limitations, non-linearities or irregularities encountered in detecting infrared energy from said medium by non-linear processing of detected infrared and non-infrared digitized pixels; and means for generating from said infrared image and said stored image a second image and wherein means for generating said infrared image substantially excludes infrared energy from said imperfections.

47. The method of claim 42 further comprising storing the map corresponding to the location and boundary of said imperfections in and on said medium.

48. The method of claim 42 further comprising identifying in the form of digitized pixels the intensity of said imperfections in and on said medium substantially devoid of image information.

49. The method of claim 48 further comprising storing in the form of digitized pixels the location, boundary, and intensity of said imperfections in and on said medium.

50. The method of claim 42 wherein the digitized pixels of the detected infrared energy corresponding to said imperfections are in spatial registry with respect to the digitized pixels of the detected visible energy corresponding to said stored image.

51. The method of claim 42 wherein the non-linear processing comprises processing information through a linear matrix in a non-linear domain.

52. The method of claim 51 wherein the matrix is a 4 by 4 matrix.

53. The method of claim 42 wherein the non-linear processing comprises processing information in a logarithmic domain.

54. The method of claim 42 wherein the non-linear processing comprises processing information in a domain between the linear and logarithmic.

55. The method of claim 42 wherein the non-linear processing comprises processing information by taking the cube root of each value of red, green, blue, and infrared associated with a particular pixel; applying a linear transform to each obtained cube root value; and cubing the resulting output of the transform for each red, green, blue, and infrared value, respectively.

56. The method of claim 55 wherein the linear transform comprises a 4 by 4 matrix.

57. The method of claim 43 further comprising storing the map corresponding to the location and boundary of said imperfections in and on said medium.

58. The method of claim 57 further comprising identifying in the form of digitized pixels the intensity of said imperfections in and on said medium substantially devoid of image information.

59. The method of claim 43 further comprising storing in the form of digitized pixels the location, boundary, and intensity of said imperfections in and on said medium.

60. The method of claim 43 wherein the digitized pixels of the detected infrared energy corresponding to said imperfections are in spatial registry with respect to the digitized pixels of the detected visible energy corresponding to said stored image.

61. The method of claim 43 wherein the non-linear processing comprises processing information through a linear matrix in a non-linear domain.

62. The method of claim 43 wherein the matrix is a 4 by 4 matrix.

63. The method of claim 43 wherein the non-linear processing comprises processing information in a logarithmic domain.

64. The method of claim 43 wherein the non-linear processing comprises processing information in a domain between the linear and logarithmic.

65. The method of claim 43 wherein the non-linear processing comprises processing information by taking the cube root of each value of red, green, blue, and infrared associated with a particular pixel; applying a linear transform to each obtained cube root value; and cubing the resulting output of the transform for each red, green, blue, and infrared value, respectively.

66. The method of claim 65 wherein the linear transform comprises a 4 by 4 matrix.

67. The apparatus of claim 44 further comprising means for storing the map corresponding to the location and boundary of said imperfections in and on said medium.

68. The apparatus of claim 44 further comprising means for identifying in the form of digitized pixels the intensity of said imperfections in and on said medium substantially devoid of image information.

69. The apparatus of claim 68 further comprising means for storing in the form of digitized pixels the location, boundary, and intensity of said imperfections in and on said medium.

70. The apparatus of claim 44 wherein the digitized pixels of the detected infrared energy corresponding to said imperfections are in spatial registry with respect to the digitized pixels of the detected visible energy corresponding to said stored image.

71. The apparatus of claim 44 wherein the non-linear processing comprises processing information through a linear matrix in a non-linear domain.

72. The apparatus of claim 71 wherein the matrix is a 4 by 4 matrix.

73. The apparatus of claim 44 wherein the non-linear processing comprises processing information in a logarithmic domain.

74. The apparatus of claim 44 wherein the non-linear processing comprises processing information in a domain between the linear and logarithmic.

75. The apparatus of claim 44 wherein the non-linear processing comprises processing information by taking the cube root of each value of red, green, blue, and infrared associated with a particular pixel; applying a linear transform to each obtained cube root value; and cubing the resulting output of the transform for each red, green, blue, and infrared value, respectively.

76. The method of claim 75 wherein the linear transform comprises a 4 by 4 matrix.

77. The apparatus of claim 45 further comprising means for storing the map corresponding to the location and boundary of said imperfections in and on said medium.

78. The apparatus of claim 45 further comprising means for identifying in the form of digitized pixels the intensity of said imperfections in and on said medium substantially devoid of image information.

79. The apparatus of claim 78 further comprising means for storing in the form of digitized pixels the location, boundary, and intensity of said imperfections in and on said medium.

80. The apparatus of claim 45 wherein the digitized pixels of the detected infrared energy corresponding to said imperfections are in spatial registry with respect to the digitized pixels of the detected visible energy corresponding to said stored image.

81. The apparatus of claim 45 wherein the non-linear processing comprises processing information through a linear matrix in a non-linear domain.

82. The apparatus of claim 81 wherein the matrix is a 4 by 4 matrix.

83. The apparatus of claim 45 wherein the non-linear processing comprises processing information in a logarithmic domain.

84. The apparatus of claim 45 wherein the non-linear processing comprises processing information in a domain between the linear and logarithmic.

85. The apparatus of claim 45 wherein the non-linear processing comprises processing information by taking the cube root of each value of red, green, blue, and infrared associated with a particular pixel; applying a linear transform to each obtained cube root value; and cubing the resulting output of the transform for each red, green, blue, and infrared value, respectively.

86. The method of claim 45 wherein the linear transform comprises a 4 by 4 matrix.

87. The apparatus of claim 46 further comprising means for storing the map corresponding to the location and boundary of said imperfections in and on said medium.

88. The apparatus of claim 46 further comprising means for identifying in the form of digitized pixels the intensity of said imperfections in and on said medium substantially devoid of image information.

89. The apparatus of claim 88 further comprising means for storing in the form of digitized pixels the location, boundary, and intensity of said imperfections in and on said medium.

90. The apparatus of claim 46 wherein the digitized pixels of the detected infrared energy corresponding to said imperfections are in spatial registry with respect to the digitized pixels of the detected visible energy corresponding to said stored image.

91. The apparatus of claim 46 wherein the non-linear processing comprises processing information through a linear matrix in a non-linear domain.

92. The apparatus of claim 91 wherein the matrix is a 4 by 4 matrix.

93. The apparatus of claim 46 wherein the non-linear processing comprises processing information in a logarithmic domain.

94. The apparatus of claim 46 wherein the non-linear processing comprises processing information in a domain between the linear and logarithmic.

95. The apparatus of claim 46 wherein the non-linear processing comprises processing information by taking the cube root of each value of red, green, blue, and infrared associated with a particular pixel; applying a linear transform to each obtained cube root value; and cubing the resulting output of the transform for each red, green, blue, and infrared value, respectively.

96. The method of claim 46 wherein the linear transform comprises a 4 by 4 matrix.

\* \* \* \* \*